K. J. BESKOW.
APPARATUS FOR REMOVING SUPERPHOSPHATES FROM THE DECOMPOSITION CHAMBER.
APPLICATION FILED OCT. 12, 1907.
949,055.
Patented Feb. 15, 1910.
3 SHEETS—SHEET 2.
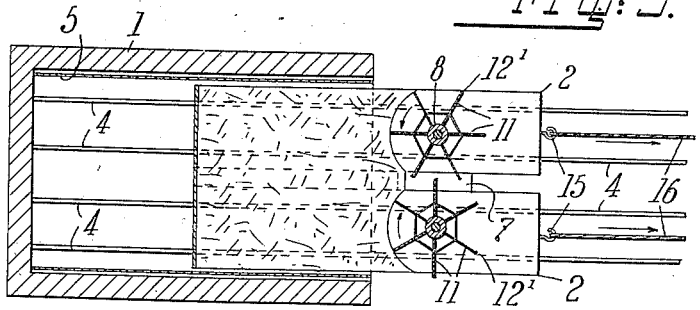
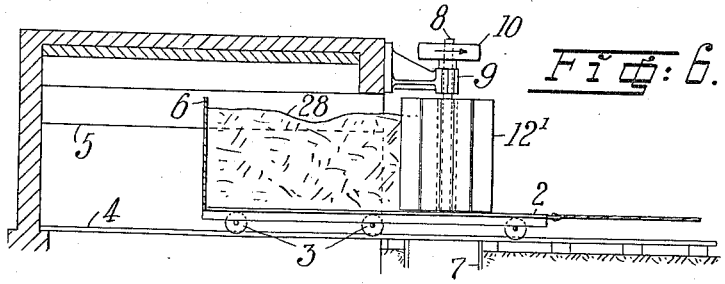
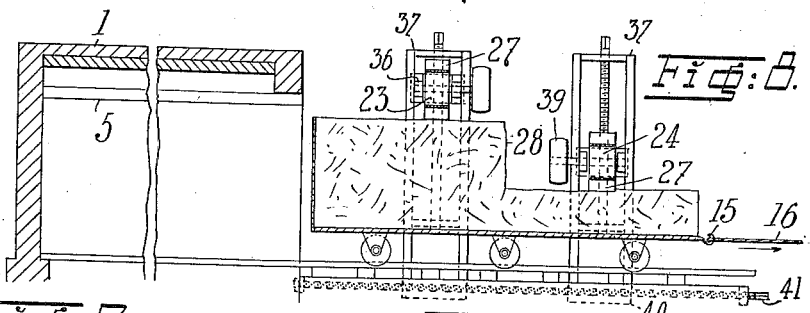
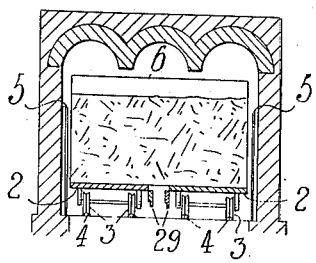
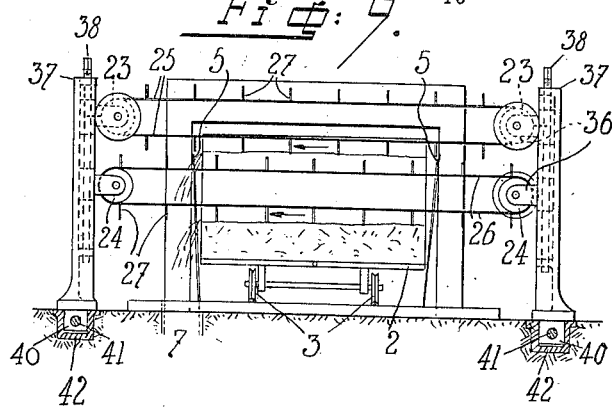
Witnesses:
Inventor:
Knut J. Beskow.
By his Attorney, K. J. BESKOW.
APPARATUS FOR REMOVING SUPERPHOSPHATES FROM THE DECOMPOSITION CHAMBER.
APPLICATION FILED OCT. 12, 1907.
949,055.
Patented Feb. 15, 1910.
3 SHEETS—SHEET 3.
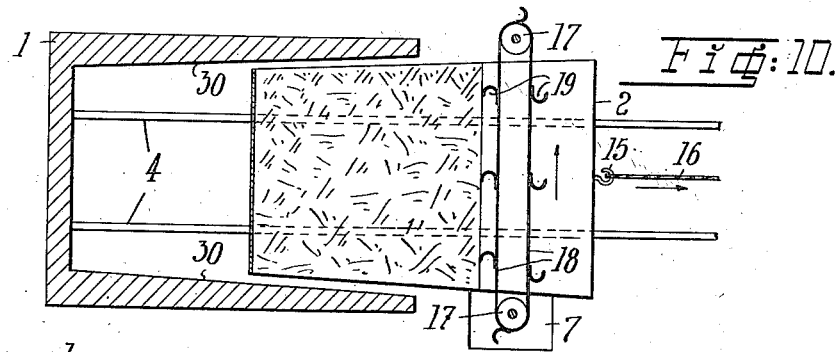
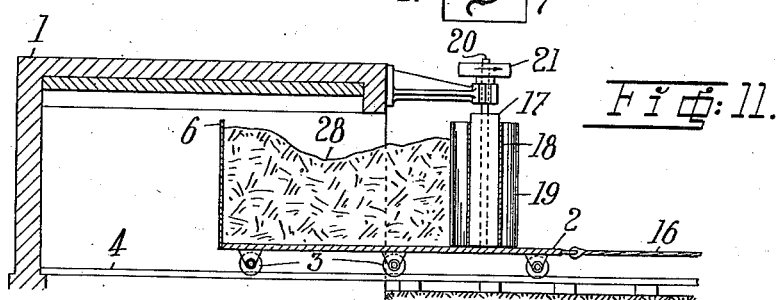
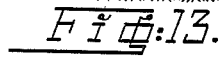
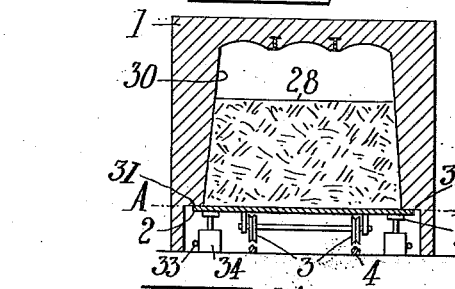
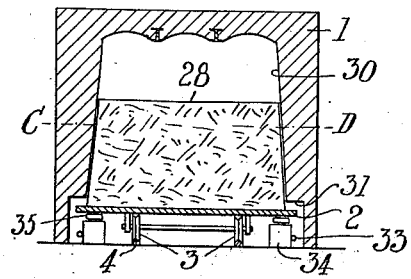
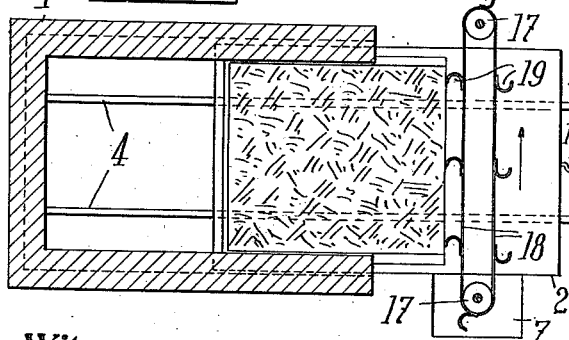
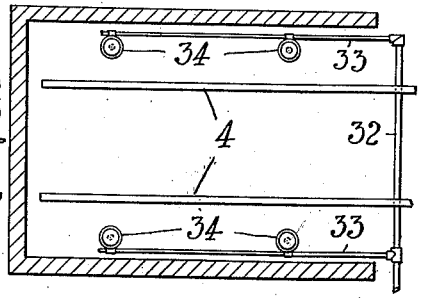
Witnesses:
Inventor:
Knut J. Beskow.
By his Attorney,

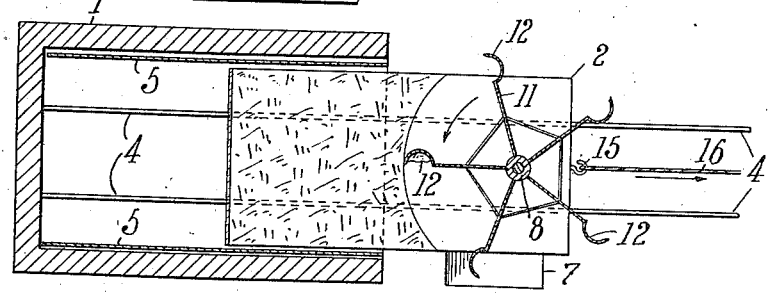
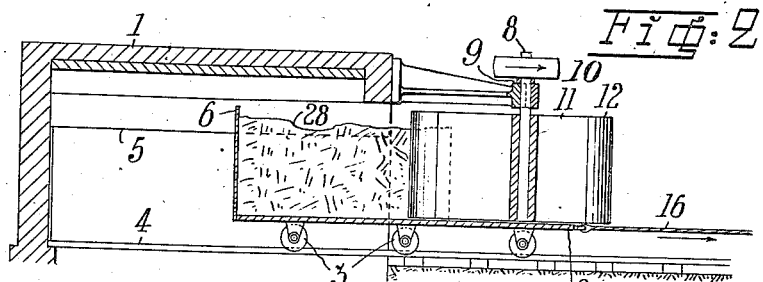
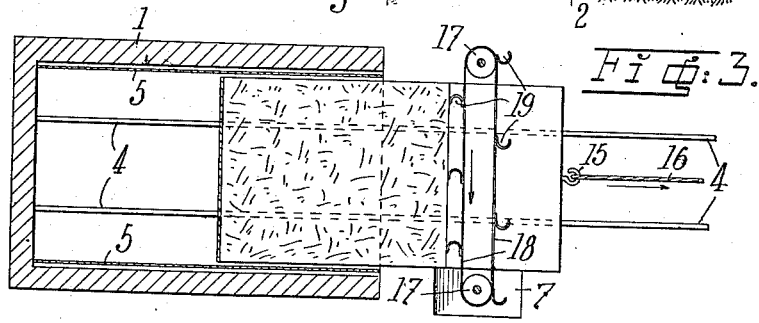
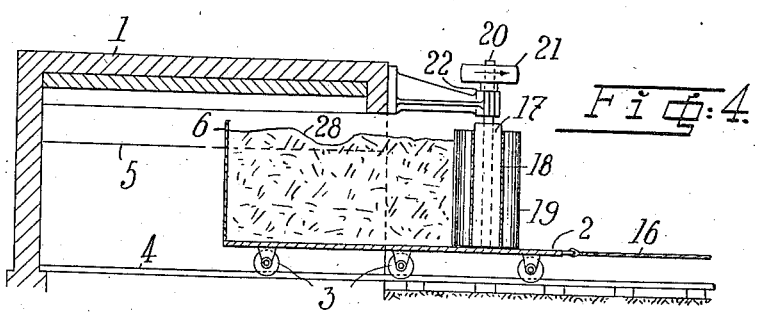

UNITED STATES PATENT OFFICE.

KNUT JAKOB BESKOW, OF HELSINGBORG, SWEDEN.

APPARATUS FOR REMOVING SUPERPHOSPHATES FROM THE DECOMPOSITION-CHAMBER.

949,055.

Specification of Letters Patent.　Patented Feb. 15, 1910.

Application filed October 12, 1907. Serial No. 397,096.

*To all whom it may concern:*

Be it known that I, KNUT JAKOB BESKOW, engineer, a subject of the King of Sweden, residing in Södergatan 19, Helsingborg, in the Kingdom of Sweden, have invented certain new and useful Improvements in Apparatus for Removing Superphosphate from the Decomposition-Chamber.

My invention relates to improvements in apparatus for removing superphosphate from the decomposition chamber and the objects of my invention are first to provide a decomposition-chamber with movable bottom so that the bottom with the masses of superphosphate resting thereon may be pulled out of the decomposition chamber; second, to provide such means that the said bottom with the masses of superphosphate resting thereon may easily be pulled out of the decomposition chamber and finally, to provide means outside of the decomposition-chamber for shoveling away the masses of superphosphate from the movable chamber bottom.

Heretofore, as far as known, nobody has succeeded in finding out a satisfactorily working machine for a complete mechanical removing of superphosphate from the decomposition-chamber. As this work, however, which is chiefly carried out by hand, is very injurious to health in consequence of the highly acid gases developed during the emptying of the chambers, and this work therefore is very expensive, it will be easily understood, that a machine capable of efficiently emptying the decomposition chamber mechanically will fulfil a long-felt requirement.

When constructing a suitable emptying device, one of the difficulties met with depends thereon that the heap of superphosphate on at least three sides is completely inclosed in a chamber with bottom and ceiling. According to the present invention this difficulty is overcome by making the bottom of the decomposition chamber movable in the shape of a carriage or the like, so that it can be pulled out, for which purpose the front wall of the chamber is made to be removed. For facilitating the removal of the said bottom with the heap of superphosphate resting on the same there are either movable side walls arranged within the decomposition chamber in such a way, that the heap of superphosphate does not come in contact with the real fixed side walls of the decomposition chamber or these latter walls are for the same purpose arranged to converge a little inward or upward as more fully explained here below. Thus the whole of the superphosphate-heap can be pulled out of the chamber, so that the heap is fully exposed and may be subjected from the sides or from above to the action of suitable mechanical means.

In the accompanying drawings, several forms of my invention are illustrated diagrammatically.

Figure 1 is a sectional plan, and Fig. 2 a side sectional elevation of a decomposition-chamber according to the present invention with one form of device for removing the masses of superphosphate from the movable bottom of the chamber; Figs. 3 and 4 are similar views illustrating another form; Fig. 5 is a sectional plan; Fig. 6 is a side sectional elevation, and Fig. 7 a cross-sectional elevation of another form of the apparatus; Fig. 8 is a side sectional elevation showing a decomposition chamber and the movable bottom with the superphosphate masses thereon pulled out of the chamber; Fig. 9 is a front view thereof. Figs. 10 and 11 illustrate in the same way as the Figs. 1 and 2 another form of the decomposition chamber. Fig. 12 is a cross sectional elevation of another form of the decomposition chamber with the chamber-bottom in raised position; Fig. 13 is a similar cross section with the chamber-bottom in lowered position ready to be pulled out. Fig. 14 is a sectional plan on the line C—D in Fig. 13. Fig. 15 is a sectional plan on the line A—B in Fig. 12 with the bottom removed.

In all figures 1 is the decomposition chamber, 2 the movable bottom supported on wheels 3 which run on rails 4, the latter extending sufficiently from the chamber. The front wall of the chamber which must be removed when the movable bottom is moved out of or into the chamber is not shown on the drawings. This wall may for instance consist of hinged gates, doors or the like.

5 are movable walls (see Figs. 1–9) which during the decomposition process are arranged on or at the side of the movable bottom and at a short distance from the walls of the chamber, which movable side walls, however, when the bottom 2 with the superphosphate mass is to be moved out of the chamber, are moved from the superphosphate mass toward the walls of the chamber, so that the sides of the superphosphate-heap become quite exposed. These side walls may for instance, be arranged either in such a manner, that during the decomposition-process they are placed on the movable bottom 2 of the chamber, but that they however, when the latter is brought out, are moved to the side and are placed upon the fixed bottom situated farther below or on the support for the rails 4 (Figs. 1–7), or the movable side walls can also be arranged in the manner shown in Fig. 9 at the sides of the movable bottom such that they can be folded against the walls of the chamber when the movable bottom is brought out of the chamber for removing the superphosphate masses.

6 is a wall fastened to the inner end of the bottom, said wall preventing the masses from coming into contact with the end wall of the chamber.

7 is a drum, a channel or the like, by means of which the superphosphate masses removed from the movable chamber bottom can be conveyed to a chamber farther below and directly to any known machine for further treating the superphosphate, or to an elevator or to another conveying machine.

16 is a cord or chain fastened to the hook 15 which is fixed to the bottom 2, by which cord or chain the movable chamber bottom can be pulled out in order to remove the superphosphate masses from the decomposition chamber.

According to the forms shown in Figs. 1–7, the superphosphate masses, at the same rate as the bottom is moved out of the chamber, are subjected to the action of blades or excavating tools which in a mechanical manner are continually shoveling away layers of the masses from the front side of the superphosphate heap, at the same time conveying the removed particles to drums or channels 7 arranged on the side of the bottom or within the latter for carrying off said particles.

According to Figs. 1 and 2 the shoveling means consist of curved vertical or substantially vertical scoops 12, fastened to arms 11 or the like rigidly connected to a shaft 8 which is rotatably supported in bearings 9, said shaft being rotated by suitable means, for instance by a driving belt (not shown) laid around a pulley 10, mounted on the shaft 8. Said shovels may also be arranged on the circumference of a rotatable drum or the like.

According to Figs. 3 and 4, the shoveling means consist of scoops 19, attached to an endless belt or a conveying chain 18, arranged on rollers 17 which are rotated by suitable means, for instance, by means of a pulley and belt (not shown), the pulley being mounted on a shaft 20 rotatably supported in bearings 22, so that the scoops 19 will move in the direction indicated by the arrow in Fig. 3, whereby they not only shovel away from the heap 28 masses of superphosphate which is continually and with a suitable velocity moved forward with the movable bottom 2, but simultaneously also convey the masses shoveled loose to the edge of the bottom, whence they drop into the drum or channel 7.

The form shown in Figs. 5 and 6 differs from the one shown in Figs. 1 and 2 by the former being provided with two sets of blades instead of one and by its movable bottom being divided into two parts, each of which is supported on wheels 3 and arranged within a certain distance from the other. During the charging and decomposition process, the space between these parts is filled with hinged flaps 29, or with other means suitable for the purpose, which, when the bottom is moved out, are folded down in the manner shown in Fig. 7. The consistency of the superphosphate mass, when being removed, is such, that it will not drop through the opening thus formed. The two sets of shoveling tools which may be formed of straight or radial plates 12', rotate toward each other in such a manner, that the removed masses are introduced by the blades into the space between the bottoms, whence they will drop into the channel 7.

According to the form shown in Figs. 8 and 9, the movable chamber bottom together with the masses resting on the same, are first entirely moved out of the decomposition chamber, whereupon the superphosphate masses are subjected to the action of shoveling tools from the top side, said shoveling tools having partly a continuous movement across the bottom, for instance in the direction indicated by the arrows in Fig. 9, and partly a reciprocatory movement parallel to the direction in which the bottom is moved and in addition thereto they are arranged to be raised and lowered. According to the drawings the shoveling and conveying means — of which two sets are shown — in this case consist of flat plates or blades 27, attached to endless conveying bands or the like, passing over rollers 23 and 24 respectively. The said rollers 23 and 24 are journaled in consoles 36 mounted in standards 37 in such a manner, that they may be raised and lowered by means of screws 38 threaded in the top parts of the standards and fastened to said consoles. The rotation of said rollers may be effected by means of driving belts (not shown) laid on pulleys 39 mounted on the shafts of the rollers. The said standards 37 are at the bottom provided with threaded bores 40 mounted to be slidable in guides 42 and connected with screws 41 in such a manner, that the said standards may be moved forward and backward by turning said screws.

Thereby the shoveling means at the same time they are moved continually across the chamber bottom and are lowered by means of the screws 38, can also be moved backward and forward along the chamber bottom over the top surface of the heap of superphosphate resting on the said bottom, which bottom during the action of said shoveling means is kept at rest. Instead of moving the standards 37 forward and backward the chamber bottom with the heap of superphosphate resting thereon may be moved forward and backward under the shovels or blades 27 during the action of the same. Evidently also in the form of the invention illustrated in the Figs. 8 and 9 the blades 27 may be curved as shown in the Fig. 3.

In the form of the decomposition chamber illustrated in the Figs. 10 and 11 and 12-15 respectively the above stated movable walls 5 are omitted. Instead thereof the fixed side walls of the decomposition chamber are arranged in such a way that the inner surfaces of the same converge either inward in the length direction of the chamber (see the Figs. 10 and 11) or upward (see the Figs. 12-15) in order that the said surfaces may not be in contact with the side-surfaces of the heap of superphosphate during the removal of this latter out of the decomposition chamber, for if no means were provided for said purpose it would not be possible to pull out of the chamber the bottom of the chamber with the masses of superphosphate resting thereon. Obviously in the form of the chamber shown in the Figs. 10 and 11 the said contact between the heap of superphosphate and the sidewalls of the chamber on account of the form of the side walls ceases as soon as the chamber bottom 2 begins to be pulled out.

According to the form of the invention illustrated in the Figs. 12-15 the heap of superphosphate is brought out of contact with the side walls by reason of the fact that the chamber bottom 2, before being pulled out, is, by suitable means—such as screw jacks, hydraulic means or the like—lowered from the position shown in Fig. 12 to the position shown in Fig. 13, whereafter it is pulled out in the manner above described. According to the Figs. 12-15 the chamber bottom 2 is raised and lowered by hydraulic means consisting of pistons 35 movably mounted in hydraulic cylinders 34 communicating with pipes 33 and 32 through which fluid under pressure acting on the pistons 35 may be introduced into and led off from the cylinders 34 when the chamber bottom is to be raised or lowered. When the chamber is to be charged, the bottom of the same is brought to bear against the shoulders 31 (see Fig. 12) and when the chamber is to be emptied the bottom 2 with the masses of superphosphate resting thereon is first lowered into the position shown in Fig. 13 and then pulled out of the chamber, whereafter the masses of superphosphate outside the chamber is removed from the bottom 2 in the manner above described. In the form illustrated in the Figs. 12-15 the inner surface of the backwall of the chamber may also be arranged obliquely upward in the same manner as the sidewalls or the contact between the said backwall and the heap of superphosphate may be prevented by means of a vertical screen or wall 6 fastened to the rear end of the said bottom in the same manner as shown in the Fig. 11. It ought also to be understood without further explanations by every one conversant with the art, that the forms of the invention described in the aforegoing, as examples, can be altered in several respects without departing from the idea of the invention. In the forms shown in Figs. 1-7 and 10-15 the shoveling means can be arranged movably in the direction toward and away from the heap of superphosphate, so that, as shown in Figs. 8 and 9, the superphosphate may be removed from the bottom while the latter is at rest.

Having thus described my invention, I declare that what I claim is:—

1. In a device of the character described, the combination with the chamber, of a movable bottom member, adapted to be moved out of the chamber with the mass of superphosphate resting thereon, and means arranged outside the chamber above the path of the movable member to disintegrate and also remove the mass supported on the member as it is drawn out from the chamber.

2. In a device of the character described, the combination with the chamber of a movable bottom member, a track leading into the chamber on which the member is slidable, and means arranged outside the chamber above the path of the movable member to disintegrate and also remove the mass supported on the member as it is drawn out from the chamber.

3. In a device of the character described, the combination with the chamber of a movable bottom member, adapted to be moved out of the chamber with the mass of superphosphate resting thereon, movable partial sidewalls or screens arranged inside the chamber at some distances from its sidewalls and adapted to be moved from the heap of superphosphate to the walls of the chamber, and means arranged outside the chamber above the path of the movable member to disintegrate and also remove the mass supported on the member as it is drawn out from the chamber.

4. In a device of the character described, the combination with the chamber of a movable bottom member, adapted to be moved out of the chamber with the mass of superphosphate resting thereon and means arranged outside the chamber above the path of the movable member to disintegrate and also remove the mass supported on the member as it is drawn out from the chamber, said means comprising blades movable to successively engage the material.

5. In a device of the character described, the combination with the chamber of a movable bottom member, adapted to be moved out of the chamber with the mass of superphosphate resting thereon and means arranged outside the chamber above the path of the movable member to disintegrate and also remove the mass supported on the member as it is drawn out from the chamber, said means comprising blades, connected to vertically arranged shafts adapted to be rotated by suitable means.

In witness whereof I have hereunto set my hand in the presence of two witnesses.

KNUT JAKOB BESKOW.

Witnesses:
OSKAR BERTHELING,
ARVID LIHNE.